US011878900B1

(12) United States Patent
Hamlik et al.

(10) Patent No.: US 11,878,900 B1
(45) Date of Patent: Jan. 23, 2024

(54) LIFT TRUCK CLAMP WITH WEAR RIB

(71) Applicant: Rightline Equipment, Inc., Rainier, OR (US)

(72) Inventors: Jim D. Hamlik, Vancouver, WA (US); Joel D. Hamlik, Vancouver, WA (US); Kevin Sandison, Vancouver, WA (US)

(73) Assignee: RIGHTLINE EQUIPMENT, INC., Rainier, OR (US)

( * ) Notice: Subject to any disclaimer, the term of this patent is extended or adjusted under 35 U.S.C. 154(b) by 0 days.

(21) Appl. No.: 17/195,594

(22) Filed: Mar. 8, 2021

Related U.S. Application Data

(60) Provisional application No. 62/986,769, filed on Mar. 8, 2020.

(51) Int. Cl.
*B66F 9/18* (2006.01)
*B66F 3/00* (2006.01)

(52) U.S. Cl.
CPC ................ *B66F 9/183* (2013.01); *B66F 3/00* (2013.01)

(58) Field of Classification Search
CPC ................................ B66F 9/183; B66F 9/188
See application file for complete search history.

(56) References Cited

U.S. PATENT DOCUMENTS

| | | | | | |
|---|---|---|---|---|---|
| 2,509,023 | A * | 5/1950 | Vogel | B66F 9/183 | 414/621 |
| 3,370,880 | A * | 2/1968 | Carliss | B66F 9/183 | 294/87.1 |
| 3,433,376 | A * | 3/1969 | Jordan | B66F 9/183 | 414/621 |
| 7,118,148 | B1 * | 10/2006 | Davis | B66F 9/183 | 294/119.1 |
| 8,016,334 | B2 * | 9/2011 | Garrett | A01D 87/127 | 294/119.1 |
| 9,321,619 | B2 * | 4/2016 | Wang | B66F 9/183 | |
| 10,280,056 | B1 * | 5/2019 | Davis | B66F 9/183 | |
| 10,377,617 | B2 * | 8/2019 | Schindlbeck | B62D 65/00 | |

* cited by examiner

*Primary Examiner* — Mark C Hageman
(74) *Attorney, Agent, or Firm* — Rylander & Associates, PC; Philip R. M. Hunt

(57) ABSTRACT

A shoe plate for use in a clamp assembly for a lift truck load handler. The shoe plate has a spine, an outside wear rib, and a load-side wear rib. The shoe plate is configured to couple detachably and interchangeably to either one of two clamp plates of a clamp assembly on a load-side of a lower portion of the clamp plate. The shoe plates are made of harder and more wear resistant materials than the clamp plates. The shoe plate has a first bracket at one end of the spine and a second bracket at the other end. Each of the brackets has a notch configured to mate with a front edge of the lower portion of either one of the two clamp plates. The brackets are also each configured to insert into a bracket recess in the load-side of one of the two clamp plates.

23 Claims, 5 Drawing Sheets

LIFT TRUCK CLAMP WITH WEAR RIB

CROSS-REFERENCE TO RELATED APPLICATIONS

This application claims the benefit of U.S. Provisional Application No. 62/986,769, filed 2020 Mar. 8, incorporated herein by reference.

FIELD OF THE INVENTION

The present invention relates to cargo handling equipment. More particularly, the present invention relates to clamps for use primarily with lift trucks.

BACKGROUND

Material handling vehicles such as lift trucks are used to pick up and deliver loads between stations. A typical lift truck 10 has a mast 12, which supports a load-lifting carriage 14 that can be raised along the mast 12 (see FIG. 1). The carriage 14 typically has one or more carriage bars 16 to which a fork frame 18 is mounted. The carriage bars 16 are coupled to the mast in a way that allows the lift truck 10 to move the carriage bars 16 up and down, but not laterally relative to the truck. The fork frame 18 carries a pair of forks 20. An operator of the lift truck 10 maneuvers the forks 20 beneath a load prior to lifting it.

Instead of forks 20, a lift truck 10 may have a load clamp assembly 32 coupled to its mast 12 (See FIG. 2). The load clamp assembly 32 typically comprises a frame 40, one or more actuators 36 and two clamp arms 34. The actuators 36 are configured to move the clamp arms 34 toward or away from each other. The clamp arms 34 may have a gripping material on the inside surfaces that contact the load. The gripping material, such as rubber or polyurethane, provides high friction contact surface for gripping the load and also provides a compressible and resilient contact surface to protect the load from superficial damage from the clamp arms 34. In use, the operator of the lift truck 10 approaches a load to be carried, such as a stack of cartons or a large appliance, such as a refrigerator. As the lift truck 10 approaches the load, the operator uses controls to open the gap between the clamp arms 34 wider than the load and may adjust the height of the clamp arms 34 so they will engage the load in a suitable location. The operator then maneuvers the lift truck 10 to straddle the load between the clamp arms 34. When the clamp arms 34 are positioned suitably around the load, the operator uses controls to bring the clamp arms 34 together, grasping the load. The operator then uses other controls to raise the load clamp assembly 32, raising the load off the floor, the load held between the clamp arms 34 by friction. The operator then drives the load to a desired location.

Load clamps, also known as carton clamps or bale clamps, are well known, but in existing designs the clamp arms 34 can suffer rapid wear.

BRIEF DESCRIPTION OF THE DRAWINGS

The present invention will be described by way of representative embodiments, illustrated in the accompanying drawings in which like references denote similar elements, and in which.

DETAILED DESCRIPTION

Before beginning a detailed description of the subject invention, mention of the following is in order. When appropriate, like reference materials and characters are used to designate identical, corresponding, or similar components in different figures.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as “upper,” “lower,” “above,” “below”, “in front of,” “behind,” etc. are intended to describe the positions and/or orientations of various components of the invention relative to one another as shown in the various Figures and are not intended to impose limitations on any position and/or orientation of any embodiment of the invention relative to any reference point external to the reference. Herein, “left” and “right” are from the perspective of an operator of a lift truck when the operator is facing the fork frame. Herein, “lateral” refers to directions to the left or the right and “longitudinal” refers to a direction perpendicular to the lateral direction and to a plane defined by the fork frame.

Those skilled in the art will recognize that numerous modifications and changes may be made to the various embodiments without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the first embodiment is essential. Other embodiments are possible, their specific designs depending upon the particular application. As such, the scope of the invention should not be limited by the particular embodiments herein described but should be defined only by the appended claims and equivalents thereof.

Representative Embodiment—Structure

Figure 1:
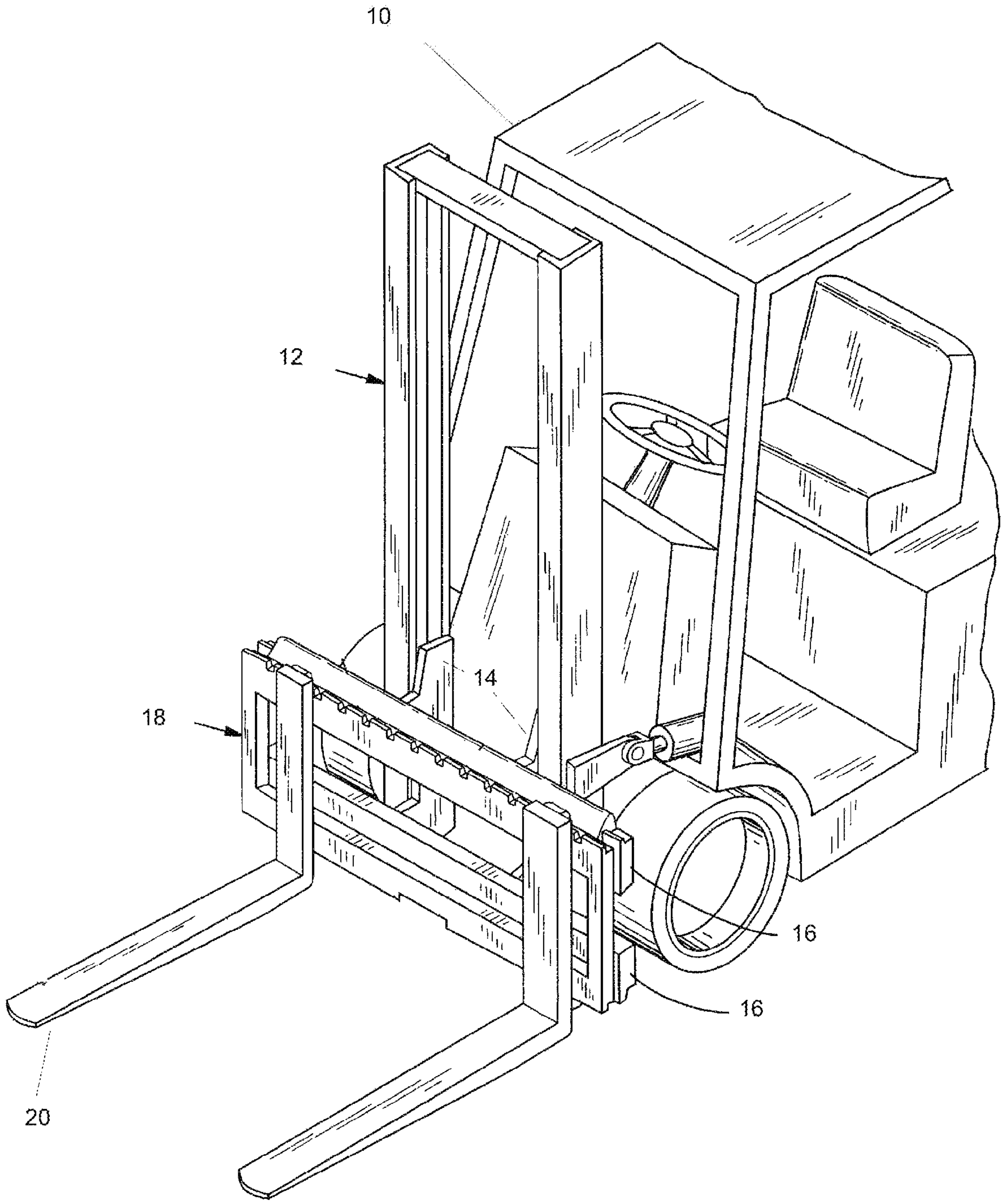
FIG. 1 (Prior Art)
FIG. 1 is an isometric view of a prior art lift truck, illustrating typical components of a lift truck equipped with forks.
Figure 2:
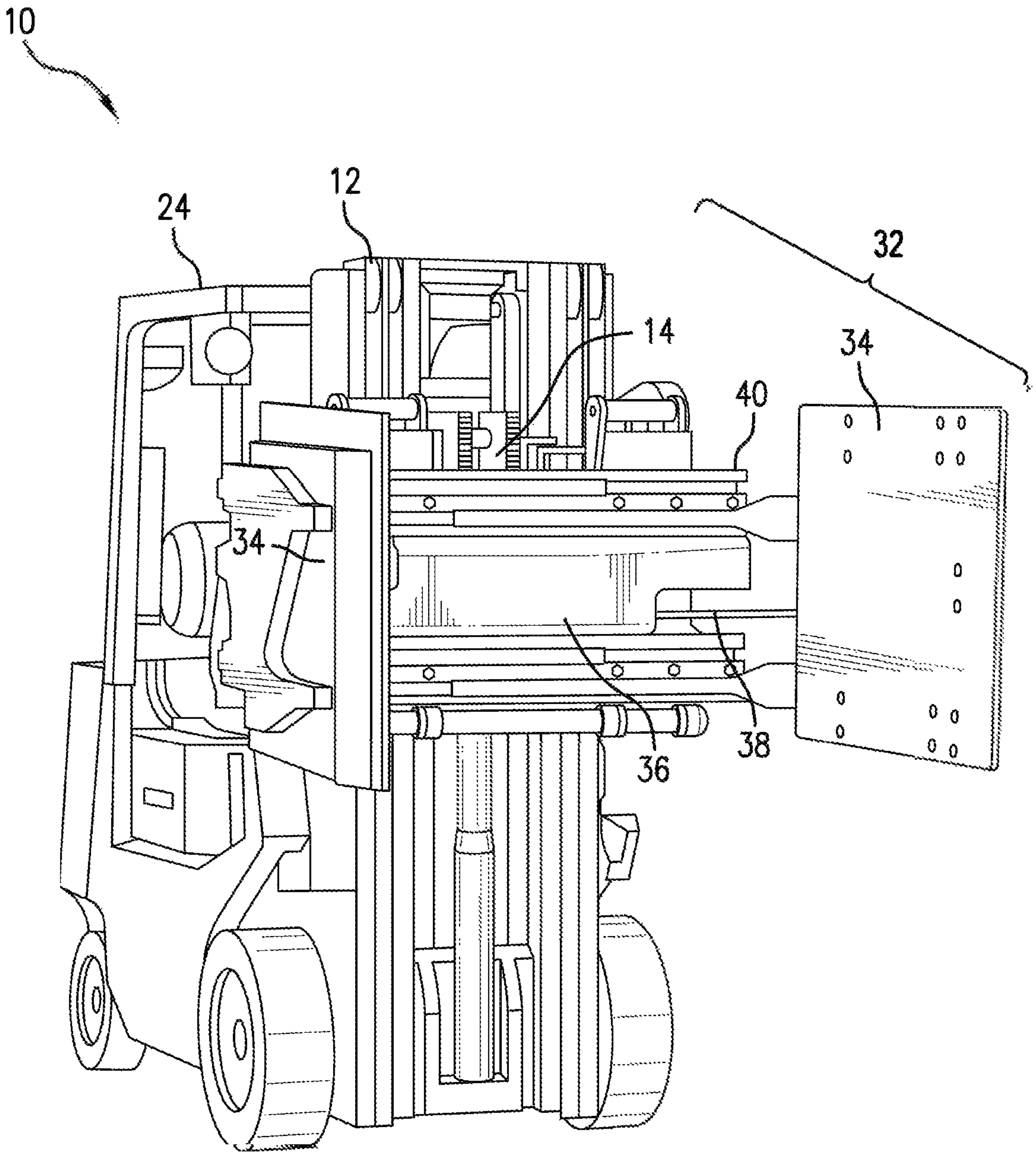
FIG.2 (Prior Art)
FIG. 2 is an isometric view of a prior art lift truck, illustrating typical components of a lift truck equipped with a load clamp assembly.
Figure 3:
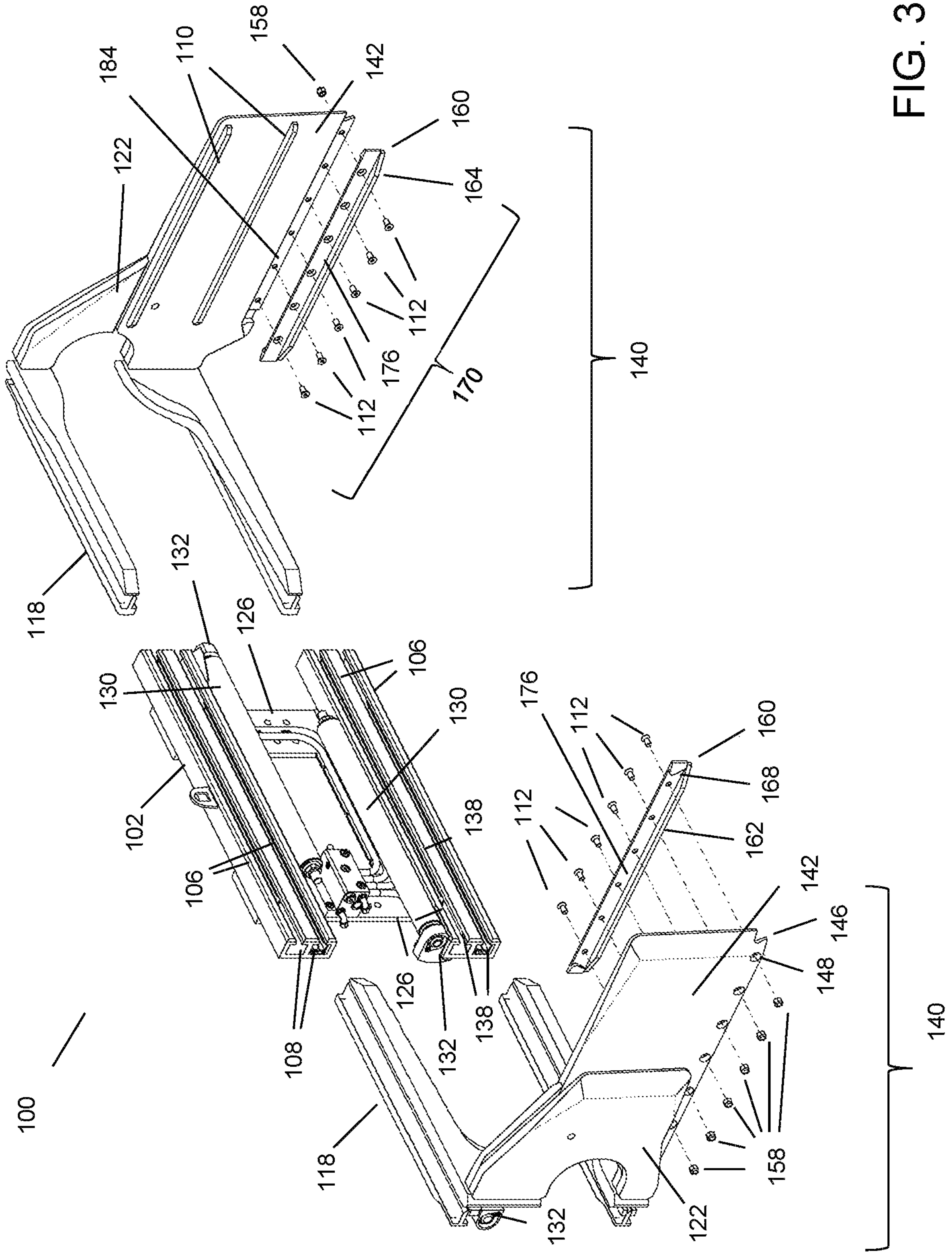
FIG. 3 is an exploded isometric front left view of a representative embodiment of a clamp assembly.

FIG. 3 is an exploded isometric front left view of a representative embodiment of a clamp assembly 100. The clamp assembly 100 comprises a frame 102, two clamp arm assemblies 140 and two actuators 130. Each actuator 130 is coupled to the frame 102 and to one of the two clamp assemblies 140. The actuators 130 are configured to pull the clamp arm assemblies 140 together or push them apart. The actuators 130 are further configured to act in tandem to provide a small amount of side shift to the two clamp assemblies 140, allowing an operator approaching a load in a lift truck 10 to make a small adjustment lateral of the clamp arm assemblies 140 if the lift truck 10 is not perfectly lined up with the load. The maximum side shift from center line that can be provided this way is one half of the stroke of the actuators 130 (one actuator 130 fully retracted, the other actuator 130 fully extended).

The frame 102 is configured to be coupled to a carriage 14 of a lift truck 10. The frame 102 comprises four guide channels 106 coupled to two frame vertical beams 126, with two guide channels 106 positioned near a top of the frame 102 and two guide channels 106 positioned near the bottom of the frame 102. In the representative embodiment, the upper two guide channels 106 share a common channel wall and the lower two guide channels 106 are similar. However, in other embodiments, the guide channels 106 do not necessarily have common walls with adjacent guide channels 106. Two actuator brackets 132 are coupled to the frame 102, one coupled to a bottom one of a lower of the top two guide channels 106, and the other coupled to a top of an upper one of the bottom two guide channels 106. The upper actuator bracket 132 is position on the right of the frame 102 and the lower actuator bracket 132 is located on the left of the frame 102, when viewed from the front. The clamp assembly 100 is in a closed configuration when the clamp arm assemblies 140 are as close together as the actuators 130 can pull them. The clamp assembly 100 is in an open configuration when the clamp arm assemblies 140 are as far apart as the actuators 130 can push them.

Each of the guide channels 106 has a guide channel cavity 108. The guide channels 106 each have a guide channel slot on the front, opening to the guide channel cavity 108. Each guide channel 106 has a channel bearing 138, positioned inside the guide channel cavity 108 and shaped to conform thereto, and with its own interior cavity that is similarly shaped, but slightly smaller. The channel bearing 138 is detachably coupled to the guide channel 106. The channel bearings 138 comprise suitable bearing material that provides low friction and is softer than the components with which it has sliding contact in order to preferentially wear. Since the channel bearings 138 are removable, they can be easily replaced when worn down.

Each clamp assembly 140 has a clamp plate assembly 170 coupled to a pair of clamp sliding beams 118 via a clamp arm bracket 122. One of the pair of clamp sliding beams 118 is coupled to an actuator bracket 132, which couples the clamp assembly 140 to the actuator 130. The pair of clamp sliding beams 118 of each clamp assembly 140 are configured to slidingly fit into two of the guide channels 106 of the frame 102. Each clamp plate assembly 170 comprises a clamp plate 142, one or more clamp plate ribs 110 and a shoe plate 160. The clamp plate 142 typically comprises steel, but may comprise other suitable materials. The clamp plate ribs 110 are typically comprised of steel, but may comprise other suitable materials. The clamp plate ribs 110 contact any load carried by the clamp assembly 100 for positive engagement. The clamp plate ribs 110 are typically welded to the clamp plate 142, but in other embodiments may be removeable with simple hand tools.

Figure 4:
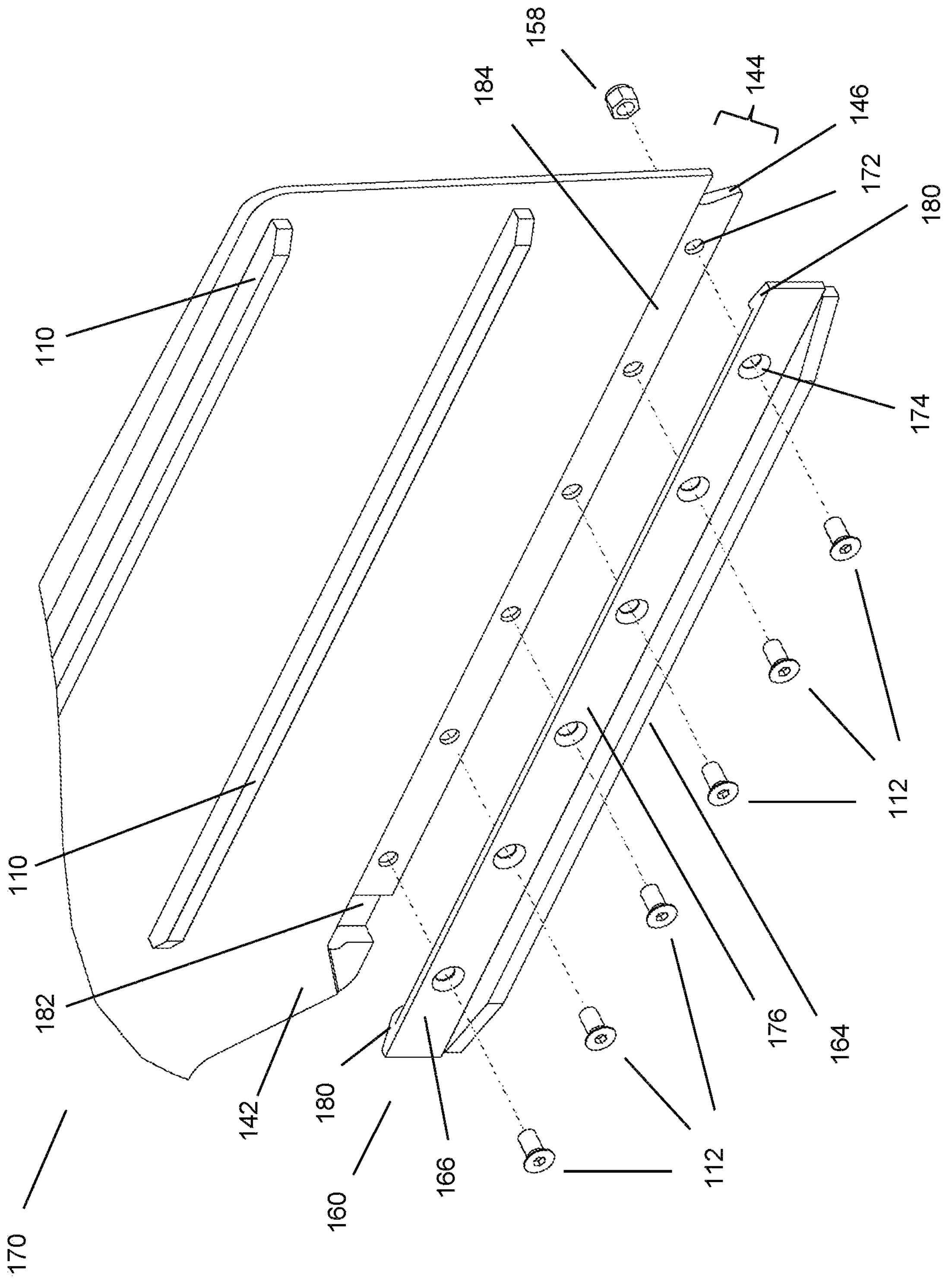
FIG. 4 is an isometric front left view of a clamp plate assembly of the clamp assembly.
Figure 5:
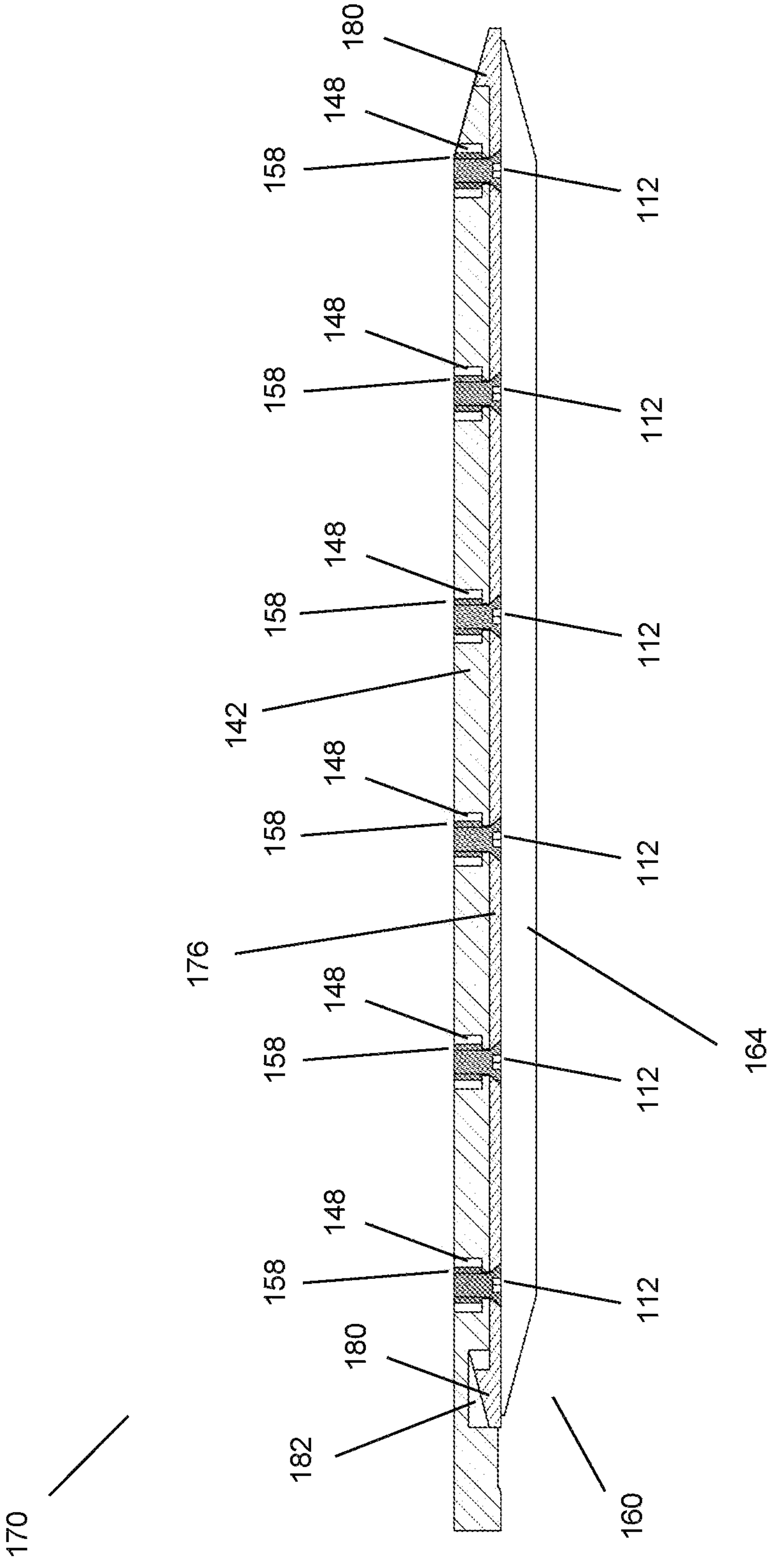
FIG. 5 is a top view of a clamp plate assembly of the clamp assembly.

FIGS. 4 and 5 show views of the clamp plate assembly 170. The clamp plate 142 has a lower portion 144 with a shoe plate recess 184 on a load side of the clamp plate 142. The shoe plate 160 is detachably coupled to the clamp plate 142, fitting within the shoe plate recess 184 of the clamp plate 142 such that the load side face of the shoe plate 160 is flush with the load side face of the clamp plate 142.

The shoe plate 160 comprises a shoe plate spine 176, two shoe plate brackets 180, an outside shoe plate wear rib 162 and a load-side shoe plate wear rib 164. The two shoe plate brackets 180 are at or coupled to the front and rear ends of the shoe plate spine 176. One of the shoe plate brackets 180 hooks onto a front edge 146 of the lower portion 144 of the clamp plate 142. The other of the shoe plate brackets 180 inserts into a bracket recess 182 in a back of the lower portion 144 of the clamp plate 142. In the representative embodiment, the clamp plate lower portion front edge 146 has angles down and forward. Each of the shoe plate brackets 180 has a notch 168 with a slope matching that of the clamp plate lower portion front edge 146 such that the shoe plate bracket 180 is configured to mate with the clamp plate lower portion front edge 146 having contact with all or a substantial portion of the clamp plate lower portion front edge 146.

The outside shoe plate wear rib 162 and the load-side shoe plate wear rib 164 are at or coupled to the lower edge of the shoe plate spine 176. The load-side shoe plate wear rib 164 provides positive engagement with a load at the lowest part of the clamp plate assembly 170. The outside shoe plate wear rib 162 extends below and under the lower portion 144 of the clamp plate 142. Thus when the operator of the lift truck 10 drags a load across the floor with the clamp assembly 100 low enough to contact the floor, the shoe plate 160 will most likely be the only point in contact with the floor and will be the part of the clamp assembly 100 that will most likely endure the most wear because of the dragging. The forward portions of the shoe plate 160 will likely take more wear than the rear portions since the forward tip of the clamp plate assembly 170 is more likely to contact the floor when moving and grasping loads. To even the wear, the shoe plates 160 are interchangeable and reversible—one may be removed from the clamp plate 142 one clamp arm assembly 140 and coupled to the clamp plate 142 on the other clamp arm assembly 140 and vice versa. The outside shoe plate wear rib 162 is identical to the load-side shoe plate wear rib 164. The load-side shoe plate wear rib 164 may have gaps along its length, effectively making a series of load-side shoe plate wear ribs 164 running from front to back of the shoe plate 160. The outside shoe plate wear rib 162 may similarly have gaps along its length. In some embodiments, the shoe plate spine 176 may extend further down than shown in FIGS. 3-4. In some such embodiments, one or more additional outside shoe plate wear ribs 162 and one or more additional load-side shoe plate wear rib 164 coupled to the shoe plate spine 176 below the outside shoe plate wear rib 162 and load-side shoe plate wear rib 164.

The shoe plate 160 has a plurality of bolt holes 174 that pass through the shoe plate 160 and the clamp plate 142 has a plurality of bolt holes 172 in the clamp plate lower portion 144. The bolt holes 174 in the shoe plate 160 may be countersunk to allow the cap screws 112 to fit flush with a load-side surface 166 of the shoe plate 160 so they do not contact or otherwise interfere with the load. Each of a plurality of cap screws 112 pass through one of the countersunk bolt holes 174 in the shoe plate 160 and one of the bolt holes 172 in the clamp plate lower portion 144, engaging with a nut 158. Each nut 158 is positioned within one of a plurality of nut recesses 148 in the clamp plate 142. The cap screws 112 and nut 158 do not protrude beyond the nut recess 148 so that there are no sharp protrusions on the outer surface of the clamp plate 142 to catch on any object as the lift truck 10 with the clamp assembly 100 move past.

In the representative embodiment, the shoe plate brackets 180, the outside shoe plate wear rib 162 and the load-side shoe plate wear rib 164 are coupled to the shoe plate 160 by welding. In some embodiments, the outside shoe plate wear rib 162 and the load-side shoe plate wear rib 164 are formed from a single piece and welded to the bottom of the shoe plate spine 176. However, in other embodiments the shoe plate brackets 180 and the shoe plate wear ribs 162, 164 are coupled to the shoe plate 160 by bolting or by some other suitable fastener. In other embodiments, the shoe plate brackets 180 and the shoe plate wear ribs 162, 164 are integral parts of the shoe plate 160. In yet other embodiments, the shoe plate brackets 180 are integrally formed as part of the shoe plate 160, such as by rolling the front and rear edges of the shoe plates 160 back towards each other. The shoe plate 160 is typically made of materials harder and more wear-resistant than the clamp plate 142, such as a wear resistant steel (e.g. Hardox®) harder and more wear-resistant than the steel that typically comprises the clamp plate 142. However, in other embodiments, the shoe plate 160 may comprise other suitable materials. The shoe plate brackets 180 typically comprise A36 steel, but may comprise other suitable materials.

Representative Embodiment—Operation

In action, the operator of a lift truck 10 opens the clamp arm assemblies 140 of the clamp assembly 100 and then moves the lift truck 10 towards a load, with one clamp plate assembly 170 on each side of the load. The operator closes the clamp arm assemblies 140 until they securely engage the load, with the clamp plate assembly 170 engaging with and gripping the load. Once the clamp plate assembly 170 has securely engaged the load, the carriage 14 of the lift truck 10 is raised, along with the clamp assembly 100 and the load. The operator then drives the lift truck 10 to where the load is desired. The clamp plate ribs 110 and the load-side shoe plate wear rib 164 engage the load and grip it. Alternatively, once the clamp plate assembly 170 has securely engaged the load, the operator may drive the lift truck 10 in reverse without lifting the carriage 14. The shoe plates 160 of the clamp plate assemblies 170 drag along the floor or pavement, protecting the other components of the clamp plate assemblies 170 from wear.

The clamp plate assembly 170 is designed for easy replacement of the shoe plates 160 when one or more become worn or damaged. To even the wear, the shoe plates 160 are interchangeable and reversible—one may be removed from the clamp plate 142 one clamp arm assembly 140 and coupled to the clamp plate 142 on the other clamp arm assembly 140 and vice versa. The cap screws 112 and nuts 158 holding the shoe plates 160 to the clamp plates 142 are removed. Then the rear shoe plate bracket 180 of each shoe plate 160 is pulled from the bracket recess 182 of the respective clamp plates 142. The front shoe plate brackets 180 are unhooked from the lower portion front edges 146 of the respective clamp plates 142. The shoe plates 160 are then placed on the opposite clamp plates 142, with the shoe plate brackets 180 that were previously in the bracket recesses 182, now hooking to the lower portion front edges 146 of the clamp plates 142. The shoe plate brackets 180 that were previously hooked to the clamp plate lower portion front edges 146, now insert into the bracket recesses 182 of the clamp plates 142. The cap screws 112 are inserted into the bolt holes 174 in the shoe plates 160 and through the bolt holes 172 in the clamp plate 142, then secured with the nuts 158, tightening to draw the shoe plate 160 to clamp plate 142.

What is claimed is:

1. A shoe plate for a clamp assembly for a lift truck load handler comprising:

a shoe plate spine with a first lateral side, a second lateral side, a top side, a bottom side, a first end and a second end, wherein the first lateral side of the shoe plate spine is laterally opposite the second lateral side of the shoe plate spine;

a first shoe plate wear rib coupled to the first lateral side of the shoe plate spine; and a second shoe plate wear rib coupled to the second lateral side of the shoe plate spine, wherein the second shoe plate wear rib is identical to the first shoe plate wear rib, and wherein the first shoe plate wear rib and the second shoe plate wear rib are in a plane that is orthogonal to the shoe plate spine.

2. The clamp assembly of claim 1, wherein the shoe plate is configured to detachably and interchangeably couple to either one of two clamp plates of the clamp assembly; and wherein the first shoe plate wear rib is configured such that when the shoe plate is coupled with either one of the two clamp plates, then the first shoe plate wear rib extends under the clamp plate and a lateral surface of the first shoe plate wear rib is flush with an outside surface of the clamp plate.

3. The clamp assembly of claim 2, wherein the shoe plate is configured to detachably and interchangeably couple within a shoe plate recess in a load-side surface of either one of the two clamp plates, the shoe plate recess in a lower portion of the clamp plate.

4. A shoe plate for a clamp assembly for a lift truck load handler comprising:

a shoe plate spine;

a first plate wear rib coupled to the shoe plate spine;

a second shoe plate wear rib coupled to the shoe plate spine;

a first shoe plate bracket coupled to a first outermost end of the shoe plate spine; and a second shoe plate bracket coupled to a second outermost end of the shoe plate spine, wherein each of the shoe plate brackets has a shoe plate bracket notch configured to mate with a clamp plate lower portion front edge of either one of two clamp plates of the clamp assembly.

5. The clamp assembly of claim 4, wherein the shoe plate is configured to mate with the clamp plate such that a load-side surface of the shoe plate spine is flush with a load side surface of the clamp plate.

6. The clamp assembly of claim 4, wherein the shoe plate is configured to mate with the clamp plate such that one of the shoe plate brackets covers the clamp plate lower portion front edge and a lateral surface of the shoe plate bracket is flush with an outside surface of the clamp plate.

7. The clamp assembly of claim 4, wherein the shoe plate is configured to mate with the clamp plate such that the first shoe plate wear rib extends under the clamp plate and a lateral surface of the first shoe plate wear rib is flush with an outside surface of the clamp plate.

8. A shoe plate for a clamp assembly for a lift truck load handler comprising:
a shoe plate spine;
a first shoe plate wear rib coupled to the shoe plate spine;
a second shoe plate wear rib coupled to the shoe plate spine;
a first shoe plate bracket coupled to a first end of the shoe plate spine; and
a second shoe plate bracket coupled to a second end of the shoe plate spine,
wherein each of the shoe plate brackets has a shoe plate bracket notch,
wherein each of the shoe plate bracket notches has an interior edge that angles outward away from a center of the shoe plate bracket and downward away from a top of the shoe plate bracket.

9. A shoe plate for a clamp assembly for a lift truck load handler comprising:
a shoe plate spine;
a first plate wear rib coupled to the shoe plate spine;
a second shoe plate wear rib coupled to the shoe plate spine;
a first shoe plate bracket coupled to a first end of the shoe plate spine;
a second shoe plate bracket coupled to a second end of the shoe plate spine; and
wherein the shoe plate is configured to hook its first shoe plate bracket onto the clamp plate lower portion front edge of the clamp plate and insert its second shoe plate bracket into a bracket recess of the clamp plate.

10. A clamp assembly for a lift truck load handler comprising:
two clamp plates, each with a load-side surface and an outside surface, the clamp plates configured to hold a load between their respective load-side surfaces,
wherein each of the clamp plates have a lower portion and a clamp plate lower portion front edge,
wherein each of the clamp plates has a bracket recess in a back of the lower portion of the clamp plate; and
two shoe plates, one of the shoe plates detachably coupled to one of the two clamp plates and the other of the two shoe plates detachably coupled to the other of the two clamp plates, wherein the two shoe plates are interchangeable,
wherein each of the two shoe plates has a first shoe plate bracket at a first end of the shoe plate and a second shoe plate bracket at a second end of the shoe plate,
wherein each of the two shoe plates has one of its shoe plate brackets hooked onto the clamp plate lower portion front edge of one of the two clamp plates and another of its shoe plate brackets inserted into its bracket recess.

11. The clamp assembly of claim 10,
wherein the shoe plates are made of harder and more wear resistant materials than the clamp plates.

12. A clamp assembly for a lift truck load handler comprising:
two clamp plates, each with a load-side surface and an outside surface, the clamp plates configured to hold a load between their respective load-side surfaces;
two shoe plates, one of the shoe plates detachably coupled to one of the two clamp plates and the other of the two shoe plates detachably coupled to the other of the two clamp plates, wherein the two shoe plates are interchangeable;
wherein each of the shoe plates has a shoe plate spine, an outside shoe plate wear rib coupled to the shoe plate spine, and a load-side shoe plate wear rib coupled to the shoe plate spine;
wherein each of the shoe plates has a first shoe plate bracket at a first end of its shoe plate spine and a second shoe plate bracket at a second end of its shoe plate spine;
wherein each of the shoe plate brackets has a shoe plate bracket notch;
wherein each of the clamp plates on their lower portion have a clamp plate lower portion front edge; and
wherein each of the shoe plate bracket notches is configured to mate with at least one of the clamp plate lower portion front edges.

13. The clamp assembly of claim 12,
wherein each of the clamp plate lower portion front edges angles outward and downward with a clamp plate lower portion front edge slope; and
wherein each of the shoe plate bracket notches has an interior edge that angles outward away from a center of the shoe plate bracket and downward away from a top of the shoe plate bracket with a shoe plate notch slope that matches the clamp plate lower portion front edge slope.

14. The clamp assembly of claim 12,
wherein each of the shoe plates has one of its shoe plate brackets hooked onto the clamp plate lower portion front edges;
wherein each of the clamp plates has a bracket recess in a back of the lower portion of the clamp plate; and
wherein each of the shoe plates has another of its shoe plate brackets inserted into the bracket recess of one of the clamp plates.

15. The clamp assembly of claim 12,
wherein the load-side surface of the shoe plate spine is flush with a load side surface of the clamp plate.

16. The clamp assembly of claim 12,
wherein an outside surface of each of the outside shoe plate wear ribs is flush with an outside surface of its respective clamp plate.

17. The clamp assembly of claim 16,
wherein one of the shoe plate brackets on each of the two shoe plates mates with the clamp plate such that the shoe plate bracket covers the clamp plate low portion front edge and an outside surface of the shoe plate bracket is flush with an outside surface of the clamp plate.

18. The clamp assembly of claim 17,
wherein outside shoe plate wear rib extends under the clamp plate and an outside surface of the outside shoe plate wear rib is flush with the outside surface of the clamp plate.

19. The clamp assembly of claim 12,
wherein each of the shoe plate wear ribs is coupled to a lower edge of its respective shoe plate spine.

20. The clamp assembly of claim 12,
wherein each of the outside shoe plate wear ribs extends under its respective clamp plate.

21. A clamp assembly for a lift truck load handler comprising:
two clamp plates, each with a load-side surface and an outside surface, the clamp plates configured to hold a load between their respective load-side surfaces,
wherein each of the clamp plates on their lower portion have a clamp plate lower portion front edge; and
two shoe plates, wherein each of the two shoe plates has a first shoe plate bracket with a first notch and a second shoe plate bracket with a second notch, the first shoe plate bracket at a first end of the shoe plate, the second shoe plate bracket at a second end of the shoe plate, wherein the first notch of each of the two shoe plates is configured to mate with the clamp plate lower portion front edge of one of the clamp plates and the second notch is configured to mate with the clamp plate lower portion front edge of the other of the two clamp plates.

22. The clamp assembly of claim 21, wherein each of the clamp plates has a shoe plate recess in the load-side surface, in a lower portion of the clamp plate; and wherein each of the two shoe plates is configured to detachably and interchangeably couple within the shoe plate recess in the load-side surface of either one of the two clamp plates.

23. The clamp assembly of claim 21, wherein each of the clamp plate lower portion front edges angles outward and downward with a clamp plate lower portion front edge slope; and wherein each of the notches has an interior edge that angles outward away from a center of the shoe plate bracket and downward away from a top of the shoe plate bracket with a notch slope that matches the clamp plate lower portion front edge slope.

* * * * *